Dec. 13, 1927.

W. E. ADAIR 1,652,340

VEHICLE HEADLIGHT

Filed Jan. 25, 1926

William E. Adair
INVENTOR.

BY

ATTORNEY.

Patented Dec. 13, 1927.

1,652,340

UNITED STATES PATENT OFFICE.

WILLIAM E. ADAIR, OF MILWAUKEE, WISCONSIN.

VEHICLE HEADLIGHT.

Application filed January 25, 1926. Serial No. 83,514.

This invention relates to improvements in vehicle headlights, having for an object to provide a novel and highly advantageous and efficient form of headlight or road lamp, especially adapted for use upon motor driven vehicles, whereby light rays may be projected forwardly and laterally of the course of road being traversed by an equipped vehicle, insuring proper illumination of such course of road as well as effectual illumination of the outer edge of the same, hence enabling the vehicle operator to accurately and properly steer the vehicle without liability of those dangers involved with the leaving of the road and also, the positive avoidance of the projection of strong or dazzling and blinding light rays into the eyes of drivers of oppositely traveling or oncoming vehicles, which, as may be well appreciated, oftentimes results in serious collisions.

Another and equally important object of the invention is to provide a road lamp of the character mentioned utilizing a novel form of casing and reflecting means, whereby the light rays emitted from the electric bulb therein will, in the course of their projection, be reflected so as to illuminate that area immediately forward and laterally outward of the equipped vehicle and at the same time, shield or divert the same from the eyes of operators of oncoming or oppositely moving vehicles, usually traversing the opposite side of the roadway, thus, preventing their temporary blinding as well as enabling the equipped vehicle operator to at all times have a clear view of that side or edge of the road course being traversed by him.

It is also an object of the invention to provide the lamp with means whereby the position of the electric bulb within it may be conveniently adjusted with respect to the reflector means employed in order that the extent and formation of projection of light rays may be controlled by a user.

Other objects of the invention will be in part obvious and in part pointed out hereinafter.

In order that the invention and its mode of operation may be readily understood by persons skilled in the art, I have, in the accompanying illustrative drawings, and in the detailed following description based thereupon, set out one possible embodiment of the same.

Figure 1:
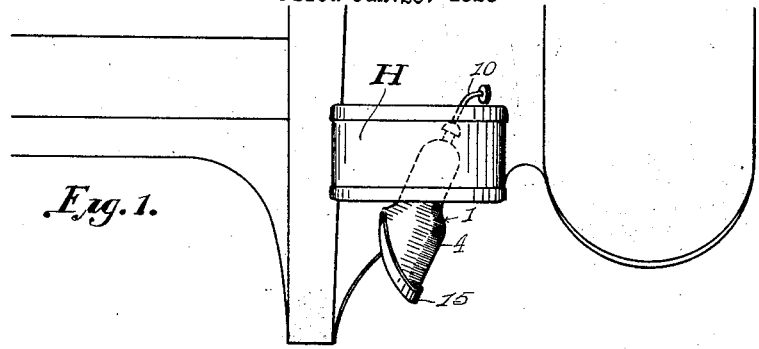
Figure 3:
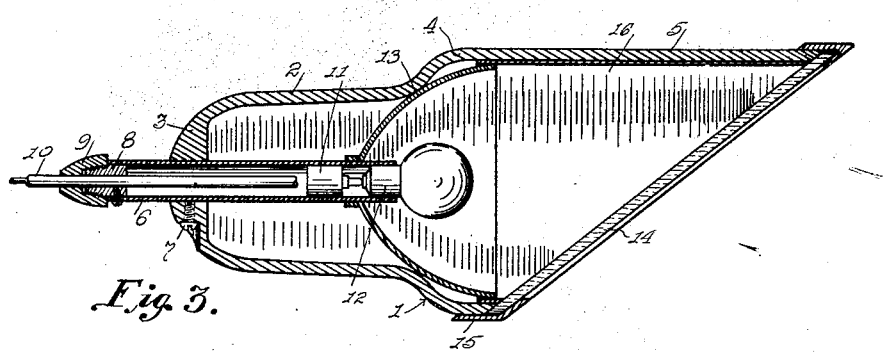
Figure 4:
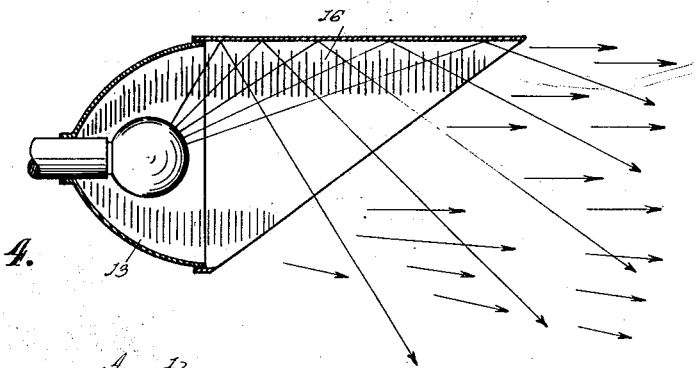
Figure 2:
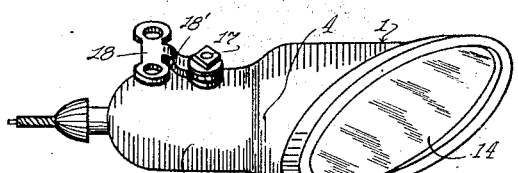

In these drawings:

Figure 1 is a fragmentary top plan view of one side and forward portion of a motor driven vehicle equipped with the improved headlight, Figure 2 is a side elevation of the same, Figure 3 is an enlarged horizontal and longitudinal section through the lamp, and Figure 4 is a detail in longitudinal and horizontal section through the reflector means, this view showing the course taken by the light rays emitted from the electric bulb.

Having more particular reference to the drawings, in connection with which like characters of reference will designate corresponding parts throughout, the improved lamp may be stated to comprise a casing generally indicated by the numeral 1, said casing being formed of metal or other suitable material and having a substantially cylindrical and reduced rearward portion 2, the end of which is rounded as at 3 and provided with a coaxially disposed extending opening, while the forward portion of the casing is circularly enlarged as indicated by the numeral 4 and has a beak-like longitudinal extension reflector wall 5 as is clearly shown in Figures 1 and 3; this beak-like extension being substantially semi-circular in cross section while the opposite side of the enlarged portion 4 is stopped materially inwardly of the same as is also shown in Figure 3, thus providing a forwardly disposed opening of substantially oval configuration arranged at an angle oblique to the longitudinal axis of the casing 1.

A tubular or sleeve-like element 6 is slidably received in the coaxially extending opening formed in the curved end portion 3 of the portion 2 of the lamp casing and is adapted to be secured in adjusted position with respect thereto through the medium of a locking screw 7; the outer end of the said tubular element 6 having a bushing 8 secured therein and provided with an opening, the outer portion of the bushing being screw threaded whereby to receive a finishing and protective cap 9, which, as will be noted, is turned into engagement with the screw threaded portion of said bushing 8 and is formed with a coaxially aligned opening to permit of the introduction of an electrical conductor 10 therethrough. This electrical conductor 10 extends into engagement with a suitable lamp connection or socket 11 while the inner end of the tubular element 6 is provided with the usual bayonet slots adapted to receive therein the diametrically opposed pins carried upon the base portion of an electric lamp or bulb 12, whereby to effect an electrical connection as between the connection 11 and said bulb 12 in order that the latter may be energized.

A paraboloidal reflector 13 of a cross sectional size to insure of its snug reception in the forward and enlarged portion 4 of the casing 1 is arranged therein, in the manner shown in Figure 3 and is provided with a centrally arranged opening to receive the forward portion of the tubular element 6 therethrough, thus insuring a central light positioning of the electric bulb 12 with respect thereto. The position of the electric bulb 12, which is carried by the slidable tubular element 6, as hereinbefore described, may be adjusted with respect to the casing 1 and by consequence, with respect to the reflector 13 and reflector 16, as hereinafter described, by loosening the set or lock screw 7 and then adjusting said tubular element 6 longitudinally to the desired extent in order that proper positioning of the electric bulb 12 with respect to said reflectors may be obtained. In this way, the extent of projection of light rays together with their formation as concerns the lamp may be effectually regulated by a user of the device.

To close the obliquely disposed forward portion of the lamp, a transparent or translucent pane or closure 14 is provided, the same being of a configuration corresponding to that of said oblique light ray emitting opening and this transparent closure 14 is preferably secured in a fixed position with respect to the lamp casing and the beak-like extension 5 through the medium of a flanged securing sleeve 15 adapted to be engaged over adjacent marginal portions of the portions 4 and 5 of the lamp casing 1 in the manner shown in Figure 3. Thus, the closure 4 will be held against displacement with respect to the lamp. In this connection, it is to be understood that various forms of transparent or translucent closures may be substituted in lieu of that herein illustrated. As for example, various types of light refractory devices may be employed or other arrangements or devices may be substituted, such as conditions or preference may dictate.

If desired, as I prefer and show, there may be arranged, adjacent the inner surface of the cross sectionally semi-circular beak-like extension 5, a reflector 16 of corresponding formation, said reflector because of this formation lying adjacent to the inner surface of said extension 5 after the fashion as shown in Figure 3, and being prevented from longitudinal movement or displacement with respect thereto by reason of the engagement of the transparent closure 14 thereover.

Because of the fact that the rearward or inner portion of this reflector 16 corresponds to the circular formation of the enlarged portion 4 of the lamp casing 1, it will be understood that snug reception of the same therein will be insured and by consequence, objectionable vibratory motion will be eliminated.

In securing my improved lamp upon a vehicle, the same may be mounted or arranged at various points thereupon. However, in actual usage, I have found it preferable to mount the lamp forwardly of an equipped vehicle and at a point directly below the usual headlight H thereof, providing the reduced portion 2 of the lamp casing with a screw threaded supporting bolt 17 adapted to be engaged with a suitable supporting means attached to or forming a portion of the receiving support upon the vehicle. If desired, a form of bracket such as shown in Figure 2 and designated by the numeral 18 may be utilized, wherein said bracket is provided with a right angularly disposed finger 18' having an aperture therein adapted to be engaged over the extended portion of the mounting bolt 17 whereupon a locking nut or other suitable device is engaged; the body portion of the bracket 18 being provided with spaced openings through which bolts or other suitable securing devices may be passed into engagement with the receiving or supporting portion of the equipped vehicle. Through this mode of mounting, it will be understood that by loosening the locking nut upon the mounting bolt 17, slight rotative adjustment of the rotary lamp may be effected and hence, the direction or course of projection of the light rays emitted from the electric bulb within the lamp may be controlled to the desired nicety by a user of the device. At this point, I also desire to note that in mounting the lamp casing 1 upon a vehicle, I preferably arrange the mounting bolt 17 at a slight angle with respect to this tube perpendicular axis. Consequently upon this, it will be understood that with rotation of the bolt and the lamp casing 1, a compound adjustment will be provided in that the lamp will be not only rotated but at the same time, it will have a slight vertical adjustment imparted thereto. Consequently upon this, the course to be illuminated by the lamp may be accurately controlled by the user.

In usage of my improved lamp, it will be seen that with mounting of the same upon a motor driven vehicle in the manner indicated in Figure 1, with energization of the electric bulb 12, the light rays emitted therefrom will be reflected from the paraboloidal reflector 13 forwardly of the same through the enlarged portion 4. Certain of these rays, which may be aptly defined as rays of incidence will be reflected upon the cross sectionally circular beak-like extension of the reflector 16 and by consequence, such light rays will assume that course as indicated by arrows in the Figure 4. The result will be that certain of the light rays emitted from the source 12 will be projected forwardly of the vehicle while others of the light rays will be reflected laterally thereof, hence, illuminating the forwardly and laterally located preceding area of the equipped vehicle. By adjusting the angle of positioning of the lamp casing 1 with respect to the forward portion of the vehicle, it will be appreciated that the light source 12 within the lamp casing may be positively shielded from the eyes of operators of approaching or oncoming vehicles, hence absolutely preventing any possibility of temporary blinding of such operators by reason of the projection of dazzling light rays into their eyes.

Manifestly, the construction shown is capable of considerable modification, and such modification as is within the scope of my claim, I consider within the spirit of my invention.

I claim:

In a lamp, a casing having a forwardly projecting open portion cut at an angle oblique to the longitudinal axis of the casing, and having a reduced rearward portion having an aperture in its rear wall, and further having an intermediate shoulder connecting said forward and rearward portions and constituting a seat, a light socket, an electric bulb, means for conducting electricity to said bulb, a paraboloidal reflector engaged with said seat at points intermediate its ends and providing a major refraction, a second reflector encased by said forward portion conformably and frictionally engaging the wall of said forward portion and having frictional engagement with the periphery of said paraboloidal reflector and providing a minor refraction substantially at right angles to said major refraction, and a lens engaging the oblique end of the casing for normally closing said forward open portion.

In witness whereof I have hereunto set my hand.

WILLIAM E. ADAIR.